![](United States Patent Office)  3,253,030
Patented May 24, 1966

3,253,030
N-2-TRICHLORO-1-HYDROXYETHYL-N'-2-
HYDROXY-ETHYL FORMAMIDE
Saul R. Buc, deceased, late of Easton, Pa., by Dolores
M. Buc, administratrix, Easton, Pa., assignor to General Aniline & Film Corporation, New York, N.Y., a corporation of Delaware
No Drawing. Filed Jan. 13, 1961, Ser. No. 82,644
1 Claim. (Cl. 260—561)

This invention relates to new products which are N-(1-hydroxy-2,2,2-trihaloethyl) derivatives of lactams and non-aromatic secondary amides, and to a process for making said products.

It has been known to react simple primary amides with chloral to produce compounds of the general formula

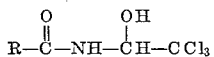

but reaction products with lactams and secondary amides have not been reported.

A primary object of this invention is to provide new compounds which are the N-(1-hydroxy-2,2,2-trihaloethyl) derivatives of lactams, such as pyrrolidone and caprolactam, and secondary amides in which the amido nitrogen is directly bonded to a non-aromatic carbon atom.

Another object of this invention is the provision of new compounds which are useful as nematocides.

Still another object is the preparation of N-chloral pyrrolidone which, when reacted with simple aliphatic or aromatic nitriles, forms compounds having fungicidal properties.

A further object of this invention is the preparation of compounds which are valuable intermediates in the preparation of ethers and esters, which are produced, respectively, by reacting the subject compounds with the appropriate alcohols or acids.

Still another object is to provide a novel process for the preparation of the novel compounds by a non-catalytic reaction between a trihalogenoacetaldehyde and (1) a secondary amide in which the amido nitrogen atom is attached to a non-aromatic carbon atom or (2) a lactam.

Other objects of this invention will appear from the following detailed description.

The foregoing objects of this invention may be attained by reacting a trihalogenoacetaldehyde, such as chloral or bromal, with a lactam, such as pyrrolidone, valerolactam or caprolactam or a carbon-substituted derivative thereof, or a secondary amide in which the carbon atom directly bonded to the amido nitrogen atom is non-aromatic in character.

The reaction in accordance with this invention proceeds according to the following equation:

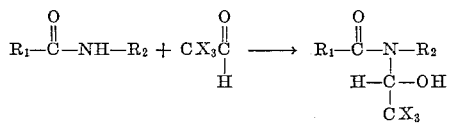

wherein X represents chlorine or bromine, $R_1$ represents hydrogen or a non-reactive organic radical, such as a substituted or unsubstituted aliphatic or aromatic radical, $R_2$ represents an aliphatic grouping and $R_1$ and $R_2$ together may constitute a divalent alkylene or substituted alkylene chain.

Suitable amido reactants include the alkylformamides, such as methyl, ethyl, propyl, etc.; the hydroxyalkylformamides; the haloalkyl formamides, such as chloromethylformamide, bromomethylformamide, fluoromethylformamide, iodomethylformamide, dichloromethylformamide, bromochloromethylformamide, trichloromethylformamide, bromodichloromethylformamide, chlorodibromomethylformamide, etc.; the alkoxylakyl formamides, such as methoxymethyl, ethoxymethyl, ethoxyethyl, etc.; the aralkyl formamides, such as benzyl formamide, phenylethyl formamide, etc.; the ring-substituted aralkyl formamides; the alkenylformamides; the nitroalkyl formamides; the alkenylphenyl formamides; the thioalkyl, alkylthioalkyl, and phenylthioalkyl formamides; the aminoalkyl, N-(alkyl) aminoalkyl, N,N-(dialkyl)aminoalkyl, N-(aryl) aminoalkyl and N,N-(diarylamino) alkyl formamides; the phenoxyalkylformamides; the halophenylalkylformamides; the alicyclic formamides, such as cyclopropyl, cyclobutyl, cyclopentyl, etc., formamides.

Still other suitable amido reactants include the derivatives of acetamide, propionamide, butyramide, etc. corresponding to the formamide derivatives named, as well as the same derivatives of alicyclic carboxamides, e.g., cyclopropylcarboxamide, cyclobutylcarboxamide, etc., and the corresponding derivatives of alkenylamides such as ethylenecarboxamide and aryl amides such as benzamide, naphthylamide, etc.

Further suitable amido reactants are the lactams, especially those containing from 4 to 7 carbons, such as pyrrolidone, valerolactam, caprolactam, etc. and their various carbon-substituted derivatives, e.g., the alkyl, alkoxy, alicyclic, dialkylamino, phenyl, phenoxy, alkylthio, phenylthio, etc. derivatives. Especially preferred in this latter group are the 1 to 5 carbon alkyl- and alkoxypyrrolidones and the 6 to 8 carbon alicyclic-substituted pyrrolidones and caprolactams.

The trihalogenoacetaldehyde reactant may be chloral or bromal, or it may be dibromochloroacetaldehyde or dichlorobromoacetaldehyde. Moreover, these aldehydes may be employed as such in the reaction or in the form of their hydrates or lower alcoholates. When they are used in the hydrate or alcoholate form, however, special techniques are needed to separate the by-product water or alcohol from the product. Depending upon the physical characteristics of the reaction product itself, azeotropic distillation, special crystallization techniques, etc., may be required.

The reaction proceeds readily at normal room temperatures and pressures. With some reactants it may be better to employ increased temperatures up to 100° C. or slightly decreased temperatures. Additionally, with some reactants, working under reduced or slightly increased pressure may be desirable. Such modifications will be readily apparent to one skilled in the art.

It is preferred to add the reactants in substantially equivalent amounts, since this results in a very pure product. However, either component may be added in excess without detriment to the reaction itself and without effect on the nature of the product.

If desired, the reaction may be carried out in a conventional inert solvent medium, such as benzene, dioxane, carbon tetrachloride, carbon disulfide, etc. It is preferred, however, to carry out the reaction in the absence of a solvent, since the presence thereof constitutes a difficultly removable contaminant in the final product and it is, therefore, economically unattractive.

The new compounds of this invention have been found to be valuable nematocides. They may be employed in the form of sprays or dusts to foliage, since they are nontoxic to plants. Moreover, they are nontoxic to animals.

The compounds of this invention may also be reacted with simple aliphatic or aromatic nitriles of the formula RCN, as is exemplified below using the N-chloral derivative of pyrrolidone:

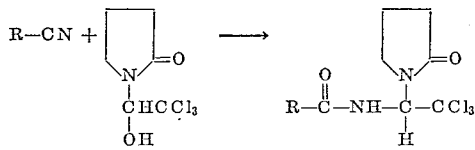

The nitrile may be acetonitrile, propionitrile, benzonitrile, etc. The products are valuable agricultural fungicides.

It is, of course, obvious that the compounds of the invention may also be reacted in the conventional manner with simple acids or alcohols to form the corresponding esters and ethers, many of which are valuable surfactants.

Having described the invention, the following examples are given by way of specific illustration:

*Example I*

77 ml. (85 grams) of pyrrolidone were placed in a flask and 50 ml. of chloral were added rapidly and with thorough stirring. The temperature of the reactants rose to 133° C. The contents of the flask were cooled to 90° C., and an additional 48 ml. of chloral were added. Total chloral charged amounted to 147.4 grams. The temperature again rose to 110° C. The entire mass was then cooled. Substantially pure chloral pyrrolidone crystallized out at 90° C.

When 5-methylpyrrolidone, 5-methoxypyrrolidone or 4-cyclohexylpyrrolidone was substituted for pyrrolidone in the above example, the corresponding N-chloral derivative was obtained.

*Example II*

226 grams (2.0 moles) of caprolactam and 196 ml. (2.0 moles) of chloral were placed in a flask and stirred. A slight temperature drop was observed, due to the negative heat of solution of caprolactam in chloral. After 5 to 6 minutes the temperature rose spontaneously to 90° C. and the mixture became homogeneous in appearance. As it cooled, the mixture became a highly viscous, glassy mass. A small portion of this mass was withdrawn and boiled with water, whereupon crystals of the N-chloral derivative of caprolactam, M.P. 96.5–97.0° C., were obtained. The residue of the mixture was heated until it became fluid, seeded with a few crystals from the boiling operation, and cooled, whereupon substantially pure crystals of N-chloral caprolactam were obtained.

When bromal is substituted for chloral, in this experiment, similar results are obtained.

*Example III*

98 ml. of chloral were stirred into 73 grams of methyl acetamide in a flask. No heat evolution was observed, but the mixture was allowed to stand for about 30 minutes and its infra-red spectrum was then determined. The carbonyl absorption band had disappeared and a hydroxyl band was present, thus confirming that the following reaction had occurred:

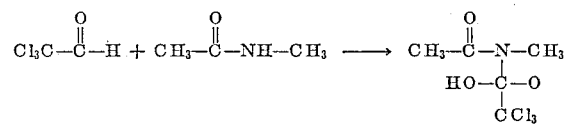

*Example IV*

Example III was repeated, substituting 1.0 mol. of ethyl acetamide for methyl acetamide, with the observation of identical behavior. The identity of the product was again established by its infra-red spectrum.

*Example V*

98 ml. (1.0 mole) of chloral was mixed with 89 grams (1.0 mole) of N-(hydroxyethyl)-formamide and a vigorous reaction ensued in which the temperature rose well over 100° C. The infra-red spectrum of the product shows no carbonyl band and a strong hydroxyl band. The ether oxygen band is so weak as to be very doubtful. From the above data, the product is believed to be a mixture of

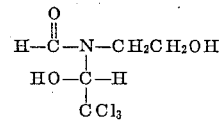

and

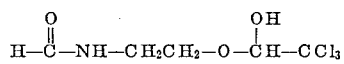

It is to be understood that the foregoing detailed description is given merely by way of illustration and that many variations may be made therein without departing from the spirit of this invention.

What is claimed is:
The compound of the formula

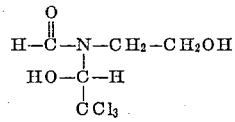

References Cited by the Examiner

UNITED STATES PATENTS 1,025,889  5/1912  Sulzberger _____ 260—561
2,924,606  2/1960  Schroeder et al. ____ 260—326.5

FOREIGN PATENTS 561,633  10/1957  Belgium.

OTHER REFERENCES

Chattaway et al.: J. Chem. Soc., 1934, pages 109–113.
Feist et al.: Ber., vol. 45, pages 945–62 (1912).
Feist et al.: Ber., vol. 47, pages 1173–93 (1914).
Noller: Chemistry of Organic Compounds, 2nd ed., pp. 139–40 (Saunders) (1957).
Thinius et al.: Chem. Tech. (Berlin), vol. 8, pages 198–200, abstracted by Chem. Abstracts at vol. 51, page 8007h (1957).

WALTER A. MODANCE, *Primary Examiner.*

IRVING MARCUS, JOHN D. RANDOLPH, ROBERT T. BOND, *Assistant Examiners.*